US012785613B2

(12) United States Patent
Kane et al.

(10) Patent No.: US 12,785,613 B2
(45) Date of Patent: Nov. 3, 2026

(54) RV AS ALTERNATIVE FOR IN-HOME SOLAR CONVERSION AND STORAGE HARDWARE

(71) Applicant: Thor Tech, Inc., Elkhart, IN (US)

(72) Inventors: James Kane, Detroit, MI (US); Thomas Parr, Parker City, IN (US); Jeffery Patterson, Elkhart, IN (US); Mitchell Johnson, Elkhart, IN (US)

(73) Assignee: Thor Tech, Inc., Elkhart, IN (US)

( * ) Notice: Subject to any disclaimer, the term of this patent is extended or adjusted under 35 U.S.C. 154(b) by 0 days.

(21) Appl. No.: 19/279,544

(22) Filed: Jul. 24, 2025

(65) Prior Publication Data

US 2026/0238157 A1 Aug. 13, 2026

Related U.S. Application Data

(60) Provisional application No. 63/674,982, filed on Jul. 24, 2024.

(51) Int. Cl.

| | |
|---|---|
| ***H02S 20/30*** | (2014.01) |
| ***B60L 50/60*** | (2019.01) |
| ***B60R 16/033*** | (2006.01) |
| ***H02J 7/35*** | (2006.01) |

(52) U.S. Cl.

CPC ............ *H02S 20/30* (2014.12); *B60R 16/033* (2013.01); *H02J 7/35* (2013.01); *B60L 50/60* (2019.02)

(58) Field of Classification Search

CPC .......... H02S 20/30; B60R 16/033; H02J 7/35; B60L 50/60

See application file for complete search history.

(56) References Cited

U.S. PATENT DOCUMENTS

| | | | | |
|---|---|---|---|---|
| 7,795,837 | B1 * | 9/2010 | Haun | H02S 10/40 320/101 |
| 8,120,310 | B2 * | 2/2012 | Littrell | B60L 8/003 320/109 |
| 9,090,163 | B2 * | 7/2015 | Syed | B60L 8/003 |
| 9,837,568 | B1 * | 12/2017 | Frimpong | H02S 20/30 |
| 10,053,035 | B1 * | 8/2018 | Dixon | B60L 58/12 |
| 10,637,269 | B2 * | 4/2020 | Zhang | B60R 16/033 |
| 10,693,315 | B2 * | 6/2020 | Kydd | B60L 53/51 |
| 12,587,012 | B2 | 3/2026 | Mills-Price et al. | |
| 2013/0076078 | A1 * | 3/2013 | Ramdeo | B60J 7/043 136/251 |

(Continued)

*Primary Examiner* — Menatoallah Youssef

*Assistant Examiner* — Michael J Warmflash

(74) *Attorney, Agent, or Firm* — Dinsmore & Shohl LLP

(57) ABSTRACT

An RV power system may include a battery and a power conversion unit coupled to the battery. At least one input of the power conversion unit may be coupled to a solar panel and at least one output of the power conversion unit may be coupled to the battery and an external power inlet. The power conversion unit may further include at least one processor and a memory module communicatively coupled to the at least one processor. The memory module may store machine readable instructions that cause the at least one processor to determine power demands from the external power inlet, determine a state of charge of the battery, and route power from the solar panel to either of the battery or the external power inlet based on the state of charge of the battery and power demands from the external power inlet.

16 Claims, 5 Drawing Sheets

(56) References Cited

U.S. PATENT DOCUMENTS

| | | | | |
|---|---|---|---|---|
| 2013/0113413 A1* | 5/2013 | Harty | B60L 53/14 | |
| | | | 320/109 | |
| 2013/0207472 A1* | 8/2013 | Chiang | H02J 50/005 | |
| | | | 307/48 | |
| 2014/0042811 A1* | 2/2014 | Myamoto | G05F 1/66 | |
| | | | 307/31 | |
| 2014/0049053 A1* | 2/2014 | Inoue | H02J 3/38 | |
| | | | 290/30 R | |
| 2018/0366789 A1* | 12/2018 | Petrella | A45C 3/00 | |
| 2020/0231120 A1* | 7/2020 | Brady | B60R 25/32 | |
| 2023/0275537 A1* | 8/2023 | Cameron | B60R 16/033 | |
| | | | 307/9.1 | |
| 2025/0381881 A1* | 12/2025 | Vilar | B60L 53/35 | |
| 2026/0031628 A1* | 1/2026 | Kane | B60L 53/20 | |
| 2026/0138405 A1* | 5/2026 | Johannes | B60D 1/62 | |

* cited by examiner

RV AS ALTERNATIVE FOR IN-HOME SOLAR CONVERSION AND STORAGE HARDWARE

CROSS-REFERENCE TO RELATED APPLICATIONS

This application claims the benefit of U.S. Provisional Application Ser. No. 63/674,982, filed Jul. 24, 2024.

BACKGROUND

The present disclosure relates to recreational vehicles. Specifically, the present disclosure relates to power systems of recreational vehicles.

BRIEF SUMMARY

According to the subject matter of the present disclosure, a recreational vehicle (RV) power system is provided. Contemplated power systems include a power conversion unit. Moreover, contemplated power systems are used to determine power demands from an external power inlet and route power from solar panels to the external power inlet, such as an external power inlet of a home or business.

Traditionally, a solar panel on or near a home/building require a power conversion system to route power from the external solar panel to the home/building. Moreover, batteries are usually required if power is to be stored rather than routed directly to the home. In embodiments illustrated herein, a power system of an RV includes a battery and a power conversion unit coupled to a solar panel. Thus, no home power conversion unit or home battery is required, as the RV power conversion unit directs power from the solar panel to the home and the RV battery stores power from the solar panel.

In accordance with one embodiment of the present disclosure, an RV power system may include a battery and a power conversion unit coupled to the battery. The power conversion unit may include at least one input and at least one output. The at least one input of the power conversion unit may be coupled to a solar panel and the at least one output of the power conversion unit may be coupled to the battery and an external power inlet. The power conversion unit may also include at least one processor and at least one non-transitory memory module communicatively coupled to the at least one processor. The at least one non-transitory memory module may store machine readable instructions that, when executed by the at least one processor, may cause the at least one processor to determine power demands from the external power inlet, determine a state of charge of the battery, and route power from the solar panel to either of the battery or the external power inlet based on the state of charge of the battery and power demands from the external power inlet.

In accordance with another embodiment of the present disclosure, an RV power system may include a battery and a power conversion unit that may be coupled to the battery. The power conversion unit may include at least one input and at least one output. The at least one input of the power conversion unit may be coupled to a solar panel and the at least one output of the power conversion unit may be coupled to the battery, an external power inlet, and at least one RV load. The power conversion unit may further include at least one processor communicatively coupled to a user device and at least one non-transitory memory module communicatively coupled to the at least one processor. The at least non-transitory one memory module may store machine readable instructions that, when executed by the at least one processor, may cause the at least one processor to determine power demands from the external power inlet, determine a state of charge of the battery, and route power from the solar panel to either of the battery or the external power inlet by prioritizing either (i) power demands from the external power inlet, (ii) charging the battery based on the state of charge of the battery, or (iii) power demands from the at least one RV load based on a user preference indicated through the user device.

In accordance with another embodiment of the present disclosure, an RV power system may include a battery and a power conversion unit coupled to the rechargeable battery. The power conversion unit may include at least one input and at least one output. The at least one input of the power conversion unit may be coupled to a first solar array and a second solar array and the at least one output of the power conversion unit may be coupled to the battery and an external power inlet. The power conversion unit may further include at least one processor communicatively coupled to a user device and at least one non-transitory memory module communicatively coupled to the at least one processor. The at least one non-transitory memory module may store machine readable instructions that, when executed by the at least one processor, may cause the at least one processor to determine power demands from the external power inlet, determine a state of charge of the battery, determine a desired state of charge of the battery, route power from the first solar array and the second solar array to either of the battery or the external power inlet, and send a notification to the user device when the battery will not reach the desired state of charge before a period of time that the RV is to be connected to the first solar array and the second solar array.

Although the concepts of the present disclosure are described herein with primary reference to RVs, it is contemplated that the concepts will enjoy applicability to any vehicle. For example, and not by way of limitation, it is contemplated that the concepts of the present disclosure will enjoy applicability to cars, trucks, tractor-trailers, or any other suitable vehicle.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
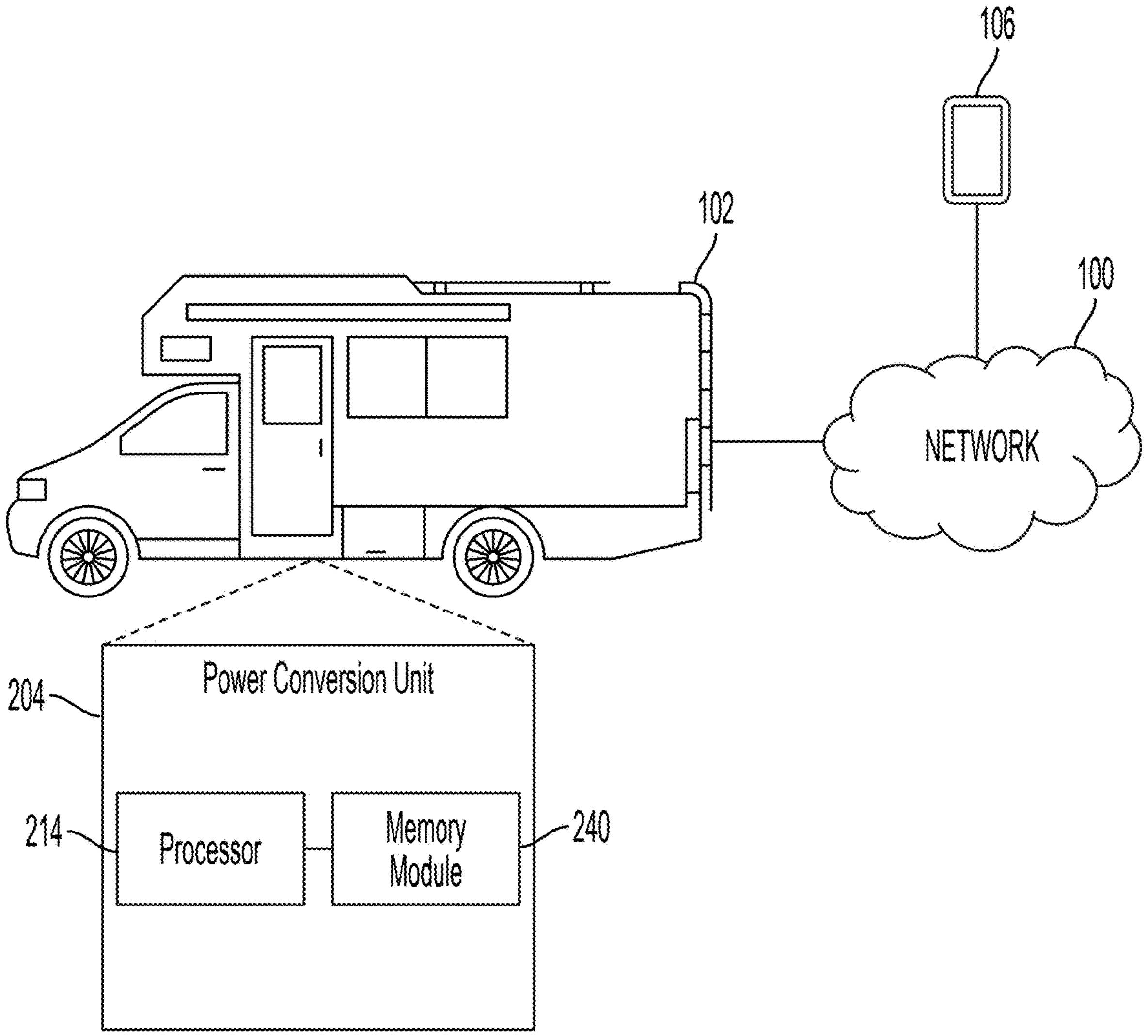
FIG. 1 illustrates an example computing environment for recreational vehicle power system, according to embodiments provided herein.

FIG. 1 depicts a computing environment for a recreational vehicle (RV) power system, according to embodiments provided herein. As illustrated, the computing environment includes a network 100 that couples an RV 102 with a user device 106. The network 100 may be configured as any wide area network (WAN), such as the internet, cellular network, public switch telephone network (PSTN), satellite network, etc.; local area network (LAN), such as Ethernet, wireless-fidelity (Wi-Fi), etc.; and/or any personal area network (PAN), such as Zigbee™, Bluetooth™ etc.

The RV 102 may include any recreational vehicle, such as travel trailers, fifth wheels, lightweight RVs, toy haulers, motorized RVs, etc. The RV 102 may further include at least one battery 103 (as depicted in FIG. 3). The RV 102 include a power conversion unit (PCU) 204 that includes at least one processor 214 and at least one non-transitory memory module 240 communicatively coupled to the processor 214. The PCU 204 may represent any integrated and/or removable electrical unit that receives input power from various sources, and converts and conditions power for use within the RV 102 or offboards the power externally (as explained further below). The PCU 204 may include hardware and software as provided with reference to FIG. 4, such as the memory module 240, which stores power routing logic 244. The PCU 204 may also include solar conversion hardware, an inverter, a charger, and a 12 VDC/DC converter, as depicted in FIGS. 2A and 2B.

The user device 106 is also coupled to the network 100. The user device 106 may be configured as any general purpose or special purpose computing device that may be moved from a first location to a second location while maintaining functionality. The user device 106 may be configured to provide one or more of user interfaces. Although the user device 106 is depicted external to the RV 102, it is noted that the user device 106 may also be a head unit of the RV 102.

It should be noted that the term "coupled to" as referred to herein may include being physically coupled, electrically coupled, and/or communicatively coupled. As an example, the PCU 204 may be coupled to a solar panel 105, the battery 103, or at least one external power inlet 210 (as described further below). Similarly, the PCU 204 may be communicatively coupled to the user device 106 in that the PCU 204 may communicate with the user device 106 to receive and/or provide data.

Figure 2A:
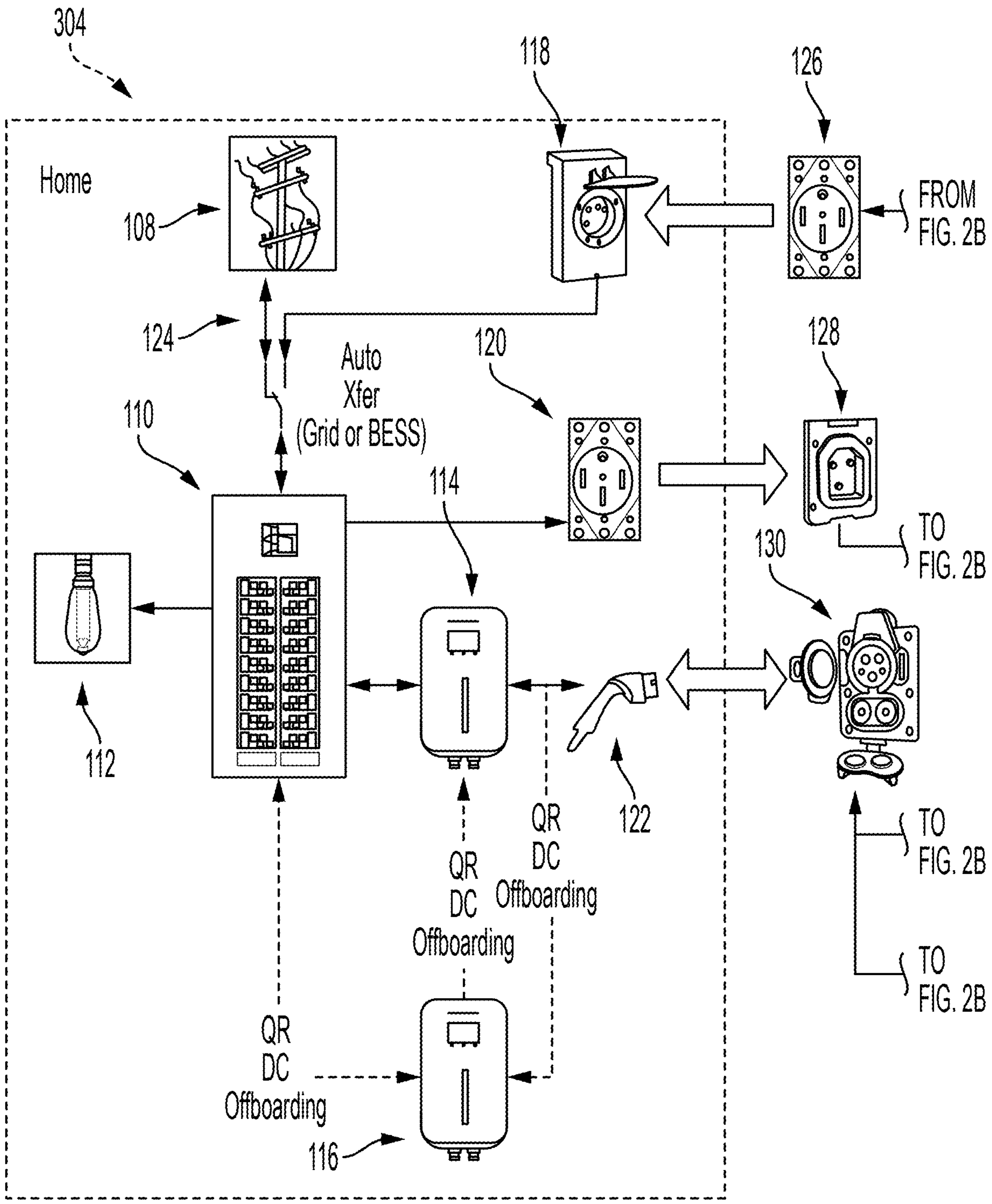
FIG. 2A illustrates an example power flow of the recreational vehicle power system, according to one embodiment of the present disclosure.
Figure 2B:
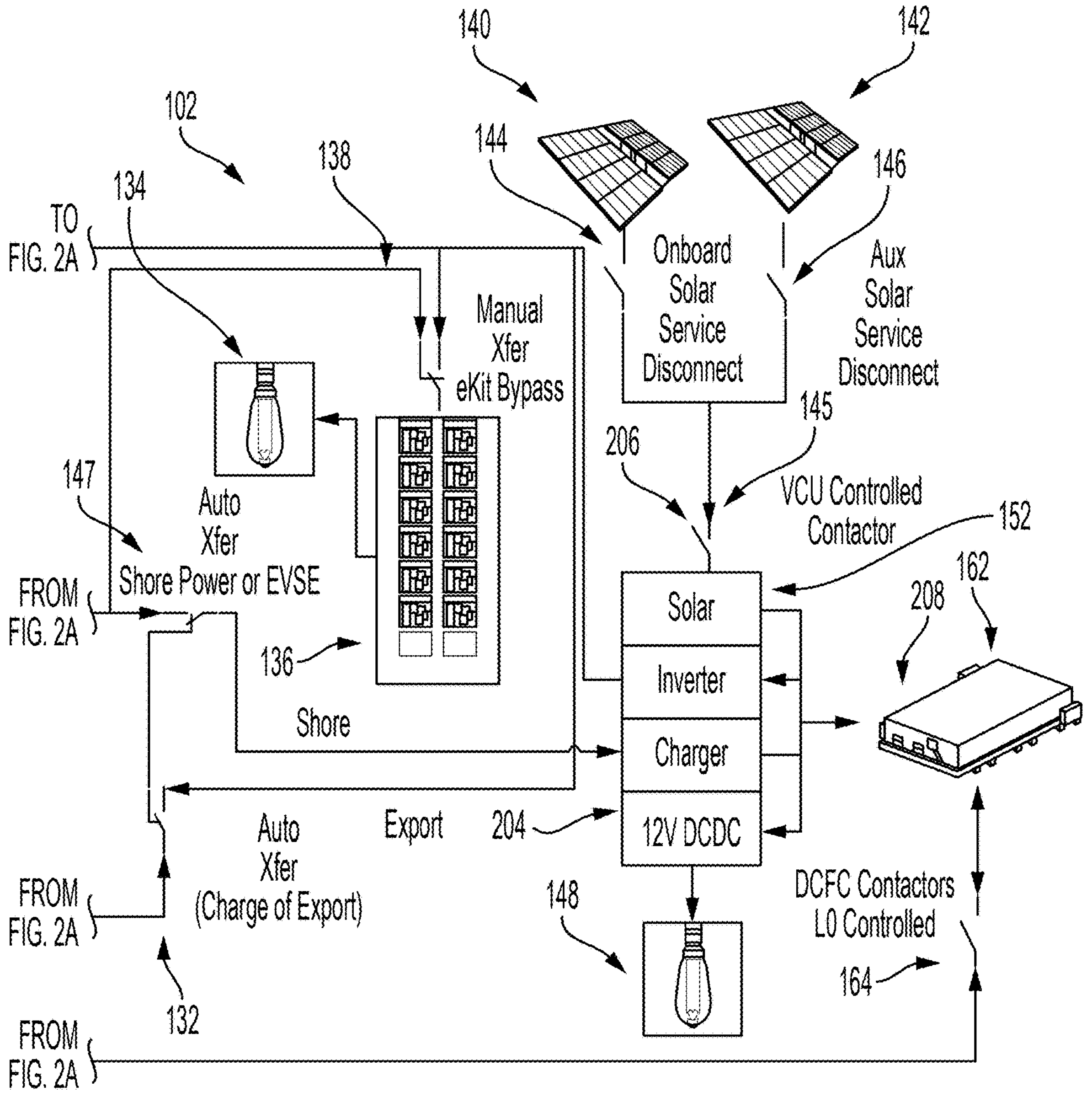
FIG. 2B illustrates an example power flow of the recreational vehicle power system, according to one embodiment of the present disclosure.
Figure 3:
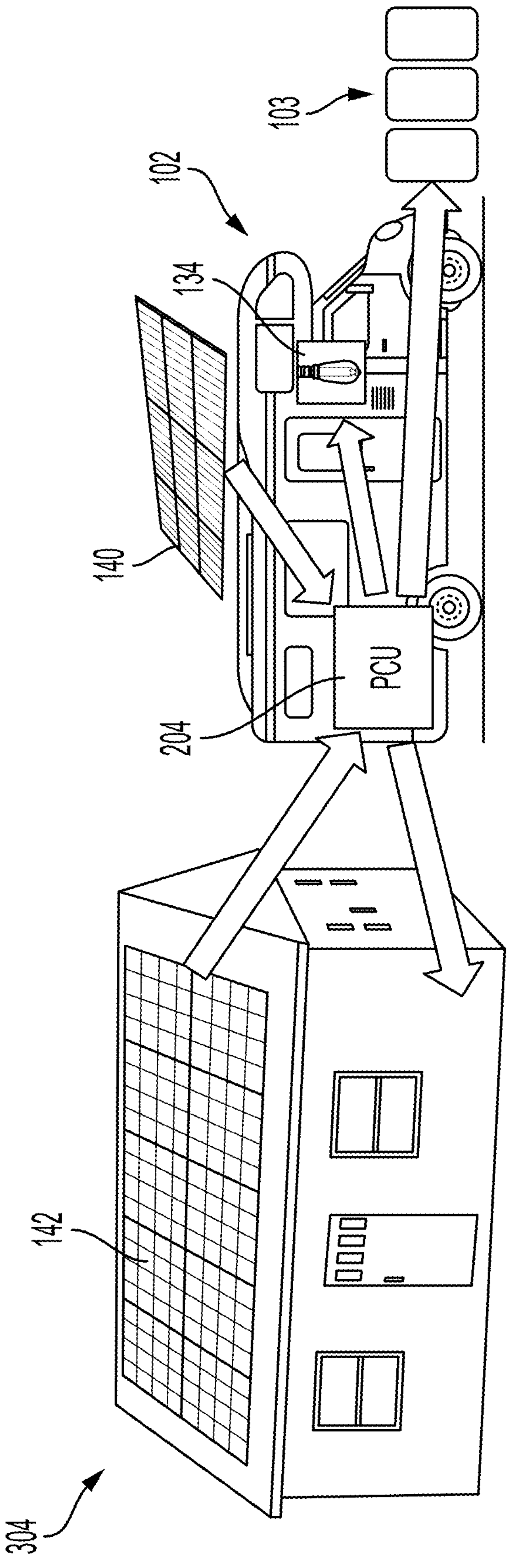
FIG. 3 illustrates an example recreational vehicle power system, according to one embodiment of the present disclosure.

Referring now to FIGS. 2A and 2B, embodiments of the present disclosure are directed to an RV power system 200 including the battery 103 and the power conversion unit (PCU) 204 coupled to the battery 103. The PCU 204 includes at least one input 206 and at least one output 208. The at least one input 206 of the PCU 204 is coupled to a solar panel 105 (such as an RV solar panel/array 140 or an auxiliary solar panel/array 142), and the at least one output 208 of the PCU 204 is coupled to the battery 103 of the RV 102 and an external power inlet 210. The battery 103 may also be coupled to the at least one input 206). The power system 200 further includes at least one processor 214 and at least one non-transitory memory module 240 communicatively coupled to the at least one processor 214 and storing machine readable instructions (depicted in FIG. 4). The machine readable instructions, when executed by the at least one processor 214 cause the at least one processor 214 to determine power demands from the external power inlet 210, determine a state of charge (SOC) of the battery 103, and route power from the solar panel 105 to either of the battery 103 or the external power inlet 210 based on a SOC of the battery 103 or the power demands from the external power inlet 210. As described in more detail below, the RV 102 is configured to provide flexible power needs to a home 304 using its on-board battery 103 and the PCU 204 in conjunction with solar panels 105. The power from the solar panels 105 may also be utilized to charge the battery 103.

Various infrastructure is described further below, which may be part of the RV power system 200.

The home 304 includes a panel 110 that receives AC power from the grid 108 under normal operating conditions. An input of the panel 110 is electrically coupled to an automatic home transfer switch 124 which is operable to switch the panel 110 between grid 108 power and backup power, such as solar power from the solar panel 105, as described in more detail below.

The home 304 further includes an external power inlet 210 (such as a home AC input receptacle 118) which is operable to receive AC power as input, such as from a generator, a backup battery, or the RV 102 as shown in FIGS. 2A and 2B. The external power inlet 210 may be configured as a generator input receptacle, for example. The external power inlet 210 is electrically coupled to a leg of the home transfer switch 124. When grid 108 power is unavailable, the home transfer switch 124 may automatically switch to the external power inlet 210 such that the panel 110 may receive AC power from the RV 102 to provide electrical power to home loads 112.

The panel 110 has a plurality of breakers for a plurality of circuits that power home loads 112, such as lights, heating and cooling systems, electronics, cooking appliances, home appliances, and the like.

The panel 110 may further include a circuit that is electrically coupled to a home AC output receptacle 120 that is operable to provide electrical power to the RV 102. As a non-limiting example, the home AC output receptacle 120 may be configured as a 50 A, 125V/250V receptacle operable to be electrically coupled to an RV AC input receptacle 128 by way of a cable assembly, as described in more detail below.

The external power inlet 210 may also be a bi-directional charger 114 provided at the home 304. The bi-directional charger 114 may be operable to both provide AC power to the RV 102 as well as receive AC power from the RV 102 to provide AC power to the panel 110. The bi-directional charger 114 may be a Level 2 charger, for example. The bi-directional charger includes a bi-directional connector 122, such as a J1772 connector, a CCS connector, or a NASC connector as non-limiting examples. In some embodiments, the bi-directional charger 114 includes a converter circuit to convert the AC power from the grid 108 at the panel 110 into DC power to be provided on DC pins of the bi-directional connector.

Thus, the bi-directional charger 114 is operable to both provide and receive AC or DC power to and from the RV 103.

The battery 103 of the RV 102 may be operable to provide DC power to various RV loads 134 of the RV 102, such as lights, heating and cooling systems, electronics, cooking appliances, home appliances, and the like. The battery 103 may also provide power to an electric motor connected to the drivetrain of the RV 102. The battery 103 may produce a DC voltage, such as 400V or 800V, for example. There may be one, two, three, or more batteries 103 of the RV 102.

An RV AC outlet receptacle 126 is provided on the RV 102 which is operable to be coupled to the external power inlet 210 by way of a cable assembly (not shown). In the illustrated embodiment the RV AC outlet receptacle 126 is depicted as a female receptacle but embodiments are not limited thereto. The RV AC outlet receptacle 126 may configured as a generator receptacle, for example. As described in more detail below, the RV AC outlet receptacle 126 is operable to provide AC power to the home 304 when the RV 103 is operating as a backup power source.

An RV AC input receptacle 128 is also provided on the RV 102 which is operable to be coupled to the home AC output receptacle 120 by way of a cable assembly (not shown). In the illustrated embodiment the RV AC input receptacle 128 is depicted as a male receptacle but embodiments are not limited thereto. The RV AC input receptacle 128 is operable to receive AC power from the home 304, which is referred to herein as "shore power." The RV AC input receptacle 128 may receive AC power from any AC source, such as the grid 108 or a generator.

The RV 102 further includes an RV bi-directional receptacle 130 that is operable to receive the bi-directional connector 122 to either receive AC or DC power, or provide AC or DC power to the home 304.

In the illustrated embodiment the RV 102 is equipped with one or more RV solar panels 140 that generate DC power. The RV 102 also has the capability of being electrically connected to one or more auxiliary solar panels 142 that are not mounted to the RV 103. The auxiliary solar panel 142 may be positioned on the roof of the home 304, or some other location that is not on the RV 102.

The multi-functional power conversion unit (PCU) 204 may be provided within the RV 102. The PCU 204 may include an inverter, that receives DC power from the battery 103 or the solar panel 105 and converts the DC power to AC power for output to the RV loads 134 or the external power inlet 210 (as described further below).

The PCU 204 both receives input power from various sources, and converts and conditions power for both use by the RV 102 as well as by the home 304 (or other external load) when in a backup mode. In embodiments, the PCU 204 may perform various functions, such as solar power routing/conversion, providing AC power to RV loads 134 or the home 304, charging the battery 103, or providing 12 VDC. As such, the PCU 204 may include inverters, chargers, and converters.

The PCU 204 is operable to receive DC input voltage as generated by the solar panel 105. As noted above, the solar panel 105 may include an RV solar panel/array 140 and an auxiliary solar panel/array 142. The RV solar panel 140 may be mounted to the RV 102. The auxiliary solar panel 142 may be mounted anywhere exterior to the RV 102, such as in a parking lot, in a yard, or on a building (such as a home or business). In embodiments described herein, the RV solar panel 140 and the auxiliary solar panel 142 may also be described as the first solar array 140 and the second solar array 142, respectively, or just as solar panel 105.

The PCU 204 may receive power from the solar panel 105 and convert the DC input voltage into a DC voltage for charging the battery 103 or charging a 12V battery of the RV 102. A PCU disconnect 150 may be provided between the solar panel 105 and the PCU 204 to disconnect the solar panel 105 from the PCU 204. The solar power provided by the solar panel 105 may also be converted to AC power by the inverter of the PCU 204 and provided at the external power inlet 210 for use by the home 304.

It is noted that although the external power inlet 210 is described and depicted as being coupled to a home 304, embodiments of the present disclosure contemplate that the external power inlet 210 may be connected to/part of any vehicle or other property, such as an office space, a store, a recreation center, a government building, and the like. As such, the RV power system 200 may be used to power any of the aforementioned vehicles/properties.

Embodiments of the present disclosure route power generated from the solar panels 105 through the PCU 204 of the RV 102. This eliminates the need for expensive power conversion equipment to be installed on the home 304. As such, the auxiliary solar panels 142 may be installed on the home 304 or near the home 304 without the need for installing power conversion equipment, as the auxiliary solar panels 142 are connected to the RV 102, which may receive, convert, and direct the solar power through the use of the PCU 204. Logic that determines how to route power from the solar panels 105 are described in greater detail below.

The PCU 204 may receive the input voltage from the RV battery 103 and may convert it to an AC voltage that is provided to an RV panel 136 through a bypass transfer switch 138 when the RV 102 is not receiving shore power. The inverter may generate a 120V AC power for use by the various RV loads 134 through the circuits of the RV panel 136.

The PCU 204 may also provide AC power at the RV AC outlet receptacle 126 for use when the RV 102 is used as a backup power source to provide AC power to the external power inlet 210. The PCU 204 also provides AC power to the RV panel 136 when the RV 102 is not connected to shore power at the RV AC input receptacle 128. In such a scenario, the bypass transfer switch 138 is set to disconnect the RV panel 136 from the RV AC input receptacle 128, and connect the RV panel 136 to the PCU 204 so that the AC power generated by the PCU 204 is available to the various RV loads 134 by way of the RV panel 136.

The PCU 204 may also provide AC power at the RV bi-directional receptacle 130 when a bi-directional transfer switch 132 is switched to connect the RV bi-directional receptacle 130 to the PCU 204. In this mode, the RV 102 exports AC power to the home 304 to use the RV 102 as a backup power source or supplemental power source to the home 304, as described further below.

The PCU 204 may also include a rectifier circuit that is operable to receive AC shore power from the RV AC input receptacle 128 and convert it into DC power to charge the battery 103, such as 400 VDC or 800 VDC. During charging, the shore power transfer switch 147 is set to receive AC power from either the RV AC input receptacle 128 or the RV bi-directional receptacle 130. The power system 200 may detect which receptacle among the RV AC input receptacle 128 and the RV bi-directional receptacle 130 is connected to shore power. When shore power is being provided at the RV AC input receptacle 128, the shore power transfer switch 146 is switched to electrically couple the RV AC input receptacle 128 to the PCU 204 so that the battery 103 is charged by shore power received from the RV AC input receptacle 128. When shore power is being provided at the RV bi-directional receptacle 130, the bi-directional transfer switch 132 and the shore power transfer switch 146 are switched to electrically couple the RV bi-directional receptacle 130 to the PCU 204 so that the battery 103 is charged by shore power received from the RV bi-directional receptacle 130.

The PCU 204 may also receive DC voltage from the battery 103 (e.g., 400V or 800V) and convert it into another voltage for use by the RV 102, such as 12 VDC. It is common for RVs to have 12V loads, such as 12V lights and 12V accessories. Thus, the PCU 204 may be electrically coupled to various RV DC loads 148.

The RV 102 may also be capable of offboarding DC power to the home 304, such as power from the RV solar panels 140 or the auxiliary solar panels 142. The RV 102 may include an RV solar panel service disconnect 144 or an auxiliary solar panel disconnect 145 to connect/disconnect the RV solar panels 140 and the auxiliary solar panels 142 to the PCU 204. The illustrated power system 200 includes a DC offboarding contact switch 164 that provides battery DC voltage from the battery 103 (e.g., 400 VDC or 800 VDC) to the DC power pins of the RV bi-directional receptacle 130, which may be a CCS receptacle having the two lower DC power pins. When in a DC offboarding mode, the DC offboarding contact switch 164 is turned on, and DC power is provided to a DC converter/charger 116 at the home 304. The DC converter/charger 116 includes an inverter that is operable to receive the DC voltage from the battery 103 and generate AC power that is then provided to the home panel 110 for use by the home loads 112.

The RV 102 may offboard DC power to the home 304 through the AC outlet receptacle 126 or the RV bi-directional receptacle 130 through the bi-directional charger 114. When offboarding power through the bi-directional charger 114, the home 304 may utilize power from the grid 108 or offboarded power from the RV through the bi-directional charger 114. In embodiments, the bi-directional charger 114 allows for the home 304 to be powered by power from the grid 108 and power from the bi-directional charger 114 simultaneously, such that the offboarded power from the RV through the bi-directional charger 114 supplements the power from the grid 108.

Although the external power inlet 210 and the bi-directional charger 114 are described herein as being separate connections, the PCU 204 may provide power to the home 304 through either of the external power inlet 210 or the bi-directional charger 114 and, as such, the external power inlet 210 and bi-directional charger 114 may be used interchangeably herein.

As noted hereinabove, the power system 200 may further include the processor 214 and the memory module 240 communicatively coupled to the processor 214. Machine readable instructions of the memory module 240 may cause the processor 214 to perform various functions described herein.

Embodiments further include logic as to when and how to best route power of the RV 102 based on the desired SOC of the battery 103 and power needs of the home 304. For example, the processor 214 may be communicatively coupled to the user device 106. In embodiments, a user may enter the desired SOC for the battery 103 and a period of time that the RV 102 will be parked at the home 304. In such embodiments, the power system 200 will charge the battery 103 to the desired SOC by the end of the entered period of time, and provide power to the home 304 using power from the battery 103 if any excess power is stored within the battery 103. The PCU 204 may be programmed to send power to the home 304 only when doing so would not deplete the battery 103 below the desired SOC.

The user may also indicate on the user device 106 preferences on how the user would like power to be distributed between the battery 103 and the home 304. As such, the power system 200 may prioritize either (i) power demands from the external power inlet 210, (ii) charging the battery 103, or power demands from the RV loads 134 based on the user preference indicated through the user device 106. For example, the user may indicate on the user device 106 that the battery 103 should be charged to 100% before any power is sent to the home 304 through the external power inlet 210. Alternatively, the user may indicate that all power should be sent to the home 304, charging the battery 103 only when excess power is generated from the solar panels 105 to charge the battery 103.

As noted hereinabove, the user may also indicate the period of time that the RV 102 is to be connected to the solar panel 105 (e.g., time the RV 102 is parked at the home 304). The power system 200 may charge the battery 103 to 100% (or to a desired SOC) based on the period of time the RV is to be connected to the solar panel 105. The power system 200 may include logic that predicts how much power is to be generated by the solar panel 105. Such prediction may be based on weather data, prior power generated by the solar panel 105 during the period of time, or any other metric that may predict power generation from the solar panel 105.

The PCU 204 may "wake-up" the system 200 periodically if the RV 102 is parked for a certain period of time, such as to charge the 12V battery of the RV 102 and prevent the 12V battery from depleting.

The power system 200 may also recognize when the battery 103 will not reach the desired SOC during the period of time the RV 102 is to be connected to the solar panels 105. Moreover, the power system 200 may send a notification to the user device 106 when the battery 103 will not reach the desired SOC before the period of time that the RV 102 is to be connected to the solar panels 105. The notification may be an alert on the user device 106, such as through an application of the user device connected to the power system 200. As such, the user may connect the RV 102 to the home AC output receptacle 120 through the RV AC input receptacle 128 to charge the battery 103 to the desired SOC.

In embodiments, the power system 200 may also send a notification to the user device 106 when the battery 103 has reached the desired SOC. In such a scenario, when the desired SOC is below 100%, the power system 200 may send a notification to the user device 106 asking the user if the user would like to adjust the desired SOC to a higher battery percentage since the battery 103 has already reached the desired SOC. When the desired SOC of the battery 103 has been reached, the power system 200 may direct any excess power from the solar panels 105 to the external power inlet 210 to power the home 304.

In further embodiments, the power system 200 may predict how long the RV 102 is to be connected to the solar panels 105. Such prediction may be based on prior periods of time that the RV 102 has been connected to the solar panels 105. Such prediction may also be based on upcoming trips that the user has planned on the user device 106. For example, the user device 106 may include a scheduled camping trip on a calendar or other application of the user device 106, and the power system 200 may recognize that the RV 102 will be disconnecting from the solar panels 105 during or just before such trip and charge the battery 103 to the desired SOC before disconnection.

The power system 200 may also determine a desired SOC based on such scheduled camping trip/other planned activities. The power system 200 may determine the desired SOC based on a mileage of the trip, duration of the trip, whether the RV 102 will be off-grid/on-grid, or charging/fueling stations on the route of the trip and charge the battery 103 to the desired SOC based on the scheduled trip.

The power system 200 may also recognize when there is a power outage at the home 304 (e.g., when the home is not receiving power through the grid 108). When the power system 200 recognizes that there is a power outage at the home 304, the power system 200 may direct power to the home 304 through the external power inlet 210, unless the user indicates on the user device 106 that the user prefers the battery 103 reach the desired SOC during the period of time that the RV 102 is to be connected to the solar panel 105, even during a power outage at the home 304.

The power system 200 may also route power from the battery 103 of the RV 102 to the home 304. The battery 103 may be above the desired SOC when connected to the solar panels 105. As such, power may be routed to the home 304 through the external power inlet 210 when the battery 103 is above the desired SOC. Moreover, the power system 200 may recognize that the period of time that the RV 102 is to be connected to the solar panels 105 is long enough that the battery 103 may be charged to the desired SOC, even when power is routed from the battery 103 to the home 304. The power system 200 may route power from the battery 103 of the RV 102 to the home 103 in such situations, lowering the energy consumption from the grid 108 by the home 304. However, the user may disable such feature on the user device 106, such as not to cycle the battery 103 and increase the lifespan of the battery 103.

In embodiments, the power system 200 may prioritize charging the battery 103 before sending power to the external power inlet 210 of the home 304, as indicated by the user on the user device 106. Alternatively, the power system may prioritize power demands from the external power inlet 210 of the home 304 before charging the battery 103, as indicated by the user on the user device 106.

In embodiments, the user may not indicate the desired SOC of the battery 103 or how power should be routed. In such embodiments, the power system 200 may be have a default setting to prioritize either the charging of the battery 103, sending power to the external power inlet 210 of the home 304, or powering the RV loads 134.

Moreover, when the battery 103 is already above the desired SOC, the power system 200 may provide solar power to home batteries (not depicted) if the power required by the home 304 is below a threshold and the battery 103 is above the desired SOC. Moreover, when the power needs of the home 304 exceed what is generated by the auxiliary solar panel 142 (alone or in combination with the RV solar panel 140), the RV 102 may supplement power generated by solar with power from the battery 103. The RV 102 may not supplement power to the home 304 if doing so would cause the battery 103 to go below the desired or threshold SOC. However, as noted hereinabove, the power system 200 may recognize that the battery 103 may go below the desired SOC and recharge to the desired SOC during the period of time that the RV 102 is to be connected to the solar panels 105. As such, the battery 103 may be depleted below the desired SOC in such situations.

As noted hereinabove, the PCU 204 may also be coupled to at least one RV load 134, such as lights, outlets, appliances, or other electrical loads of the RV 102. As such, excess solar power from the solar panels 105 may also be provided to the RV loads when the battery 103 has reached the desired SOC.

Embodiments of the present disclosure further include one or more controllers to determine the needs of the power system 200 and activate the various switches accordingly. For example, when the RV 102 is plugged into shore power at the RV AC input receptacle 128, the shore power transfer switch 146 is switched to connect the RV AC input receptacle 128 to the PCU 204 to provide shore power thereto. Additionally, the bypass transfer switch 138 is switched to connect the RV AC input receptacle 128 to the RV panel 136 such that the RV loads 134 and the RV DC loads 148 are powered using shore power.

When the one or more controllers sense an interruption of shore power (e.g., the grid 108 goes down), the bypass transfer switch 138 switches such that the PCU 204 is connected to the RV panel 136. In this state, AC power provided by the inverter of the PCU 204 is provided to the RV AC outlet receptacle 126. The home transfer switch 124 is switched to connect the external power inlet 210 to the RV AC outlet receptacle 126, which receives backup AC power from the RV 102 at the RV AC outlet receptacle 126. Backup AC power from the RV 102 may also be provided at the RV bi-directional receptacle 130 by the switching of the bi-directional transfer switch 132 to connect the RV bi-directional receptacle 130 to the inverter of the PCU 204.

FIG. 3 depicts a schematic representation of the embodiments described herein. As noted herein, the PCU 204 may be connected to solar panels 105 (e.g., the RV solar panels 140 or the auxiliary solar panels 142). Using the logic described herein, the PCU 204 may direct power to the RV loads 134, the batteries 103 of the RV 102, to the home 304 through the external power inlet 210, or to batteries of the home 304 (not depicted). The batteries 103 are depicted external to the RV 102, but it should be understood that the batteries 103 may be integrated within the RV 102.

Figure 4:
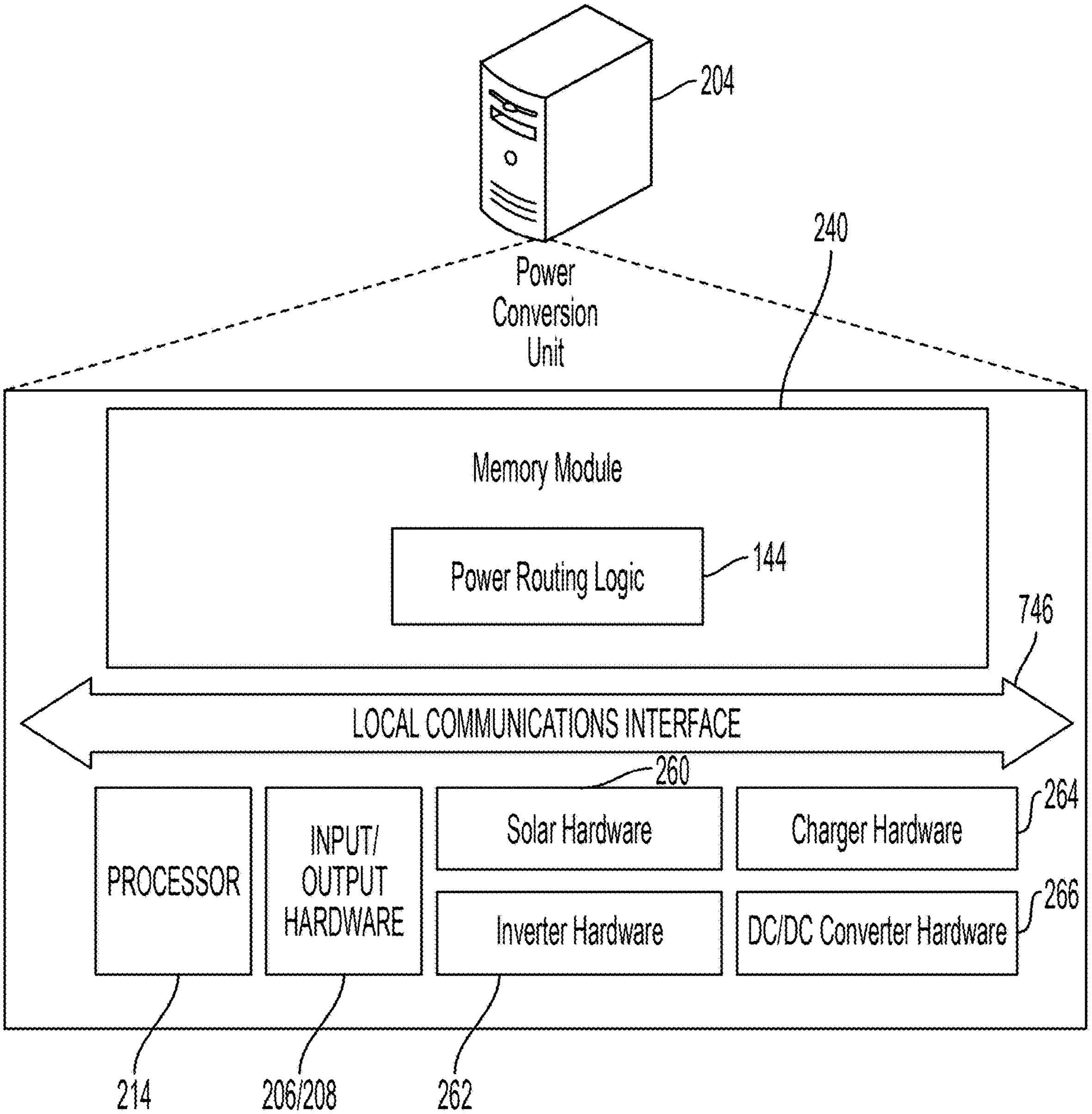
FIG. 4 illustrates an example power conversion unit for a recreational vehicle, according to embodiments provided herein.

FIG. 4 depicts the PCU 204 of the RV power system 200, according to embodiments provided herein. As illustrated, the PCU 204 includes the memory module 240, the processor 214 input/output hardware 206/208, solar hardware 260, inverter hardware 262, charger hardware 264, and DC/DC converter hardware 266. The memory module 240 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the PCU 204 and/or external to the remote PCU 204.

The memory module 240 may store power routing logic 244. The power routing logic 244 may each include a plurality of different pieces of logic, each of which may be embodied as a computer program, firmware, and/or hardware, as an example. The power routing logic 244 may cause the processor 214 of the PCU 204 to route power to various electronics, such as the battery 103 or the external power inlet 210, as described in embodiments herein. A local interface 746 is also included in FIG. 4 and may be implemented as a bus or other communication interface to facilitate communication among the components of the PCU 204.

The processor 214 may include any processing component operable to receive and execute instructions (such as from the memory module 240). The input/output hardware 206/208 may be configured to interface with various electrical systems, such as the battery 103, the external power inlet 210, or the RV loads 134 (as described hereinabove).

Network interface hardware may also be included within the PCU 204 and may be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the PCU 204 and other computing devices, such as the user device 106.

The power routing logic 244 may include an operating system and/or other software for managing components of the PCU 204. As also discussed above, the power routing logic 244 may reside in the memory module 240 and may be configured to perform the functionality, as described herein. Moreover, the solar hardware 260, the inverter hardware 262, the charger hardware 264, and the DC/DC converter hardware 266 may be utilized to execute the power transfer/conversion functions described hereinabove.

It should be understood that, while the PCU 204 is illustrated as a single device, this is also merely an example. In some embodiments, the components depicted in FIG. 4 may be located on other devices, and communicatively coupled to the PCU 204. Moreover, one or more of the functionalities and/or components described herein may be provided by the user device 106.

Collectively, the various features of the RV power system described herein provide a power conversion unit for power drawn from solar panels. Notably, the power conversion unit of the RV negates the need for expensive power conversion equipment or batteries to be installed at a home/business. The RV power system also includes logic as to how to route the power from the solar panels and, thus, powers the home/building or charges the battery of the RV depending on a default setting, user preferences, or desired state of charge.

For the purposes of describing and defining the present invention it is noted that terms like "near" are utilized herein to represent the inherent degree of uncertainty that may be attributed to any quantitative comparison, value, measurement, or other representation. The term "near" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle (RV) power system comprising:

a battery;

a power conversion unit coupled to the battery, the power conversion unit comprising at least one input and at least one output, wherein:

the at least one input of the power conversion unit is coupled to a solar panel; and the at least one output of the power conversion unit is coupled to the battery and an external power inlet;

at least one processor;

at least one non-transitory memory module communicatively coupled to the at least one processor and storing machine readable instructions that, when executed by the at least one processor, cause the at least one processor to perform at least the following:

determine power demands from the external power inlet;

determine a state of charge of the battery;

determine a desired state of charge of the battery determine a period of time that the power conversion unit is to be connected to the solar panel;

route power from the solar panel to either of the battery or the external power inlet based on the state of charge of the battery and power demands from the external power inlet;

charge the battery to the desired state of charge during the period of time that the power conversion unit is to be connected to the solar panel; and notify a user if the battery is unable to be charged to the desired state of charge during the period of time that the RV is to be connected to the solar panel.

2. The RV power system of claim 1, wherein the external power inlet is a home AC input receptacle.

3. The RV power system of claim 1, wherein power is routed from the solar panel to the battery through a charger and power is routed from the solar panel to the external power inlet through an RV AC outlet receptacle.

4. The RV power system of claim 1, wherein the machine readable instructions stored in the at least one non-transitory memory module further cause the at least one processor to prioritize charging the battery before sending power to the external power inlet.

5. The RV power system of claim 1, wherein the machine readable instructions stored in the at least one non-transitory memory module further cause the at least one processor to prioritize power demands from the external power inlet before charging the battery.

6. The RV power system of claim 1, wherein the at least one processor is communicatively coupled to a user device.

7. The RV power system of claim 6, wherein the machine readable instructions stored in the at least one non-transitory memory module further cause the at least one processor to prioritize either (i) power demands from the external power inlet or (ii) charging the battery based on a user preference indicated through the user device.

8. The RV power system of claim 6, wherein the machine readable instructions stored in the at least one non-transitory memory module further cause the at least one processor to send a notification to the user device when the battery will not reach a desired state of charge before a period of time that the RV is to be connected to the solar panel.

9. The RV power system of claim 6, wherein the machine readable instructions stored in the at least one non-transitory memory module further cause the at least one processor to send a notification to the user device when the battery has reached a desired state of charge.

10. The RV power system of claim 1, wherein the at least one output of the power conversion unit is coupled to at least one RV load.

11. A recreational vehicle (RV) power system comprising:

a battery;

a power conversion unit coupled to the battery, the power conversion unit comprising at least one input and at least one output, wherein:

the at least one input of the power conversion unit is coupled to a solar panel; and the at least one output of the power conversion unit is coupled to the battery, an external power inlet, and at least one RV load;

at least one processor communicatively coupled to a user device;

at least one non-transitory memory module communicatively coupled to the at least one processor and storing machine readable instructions that, when executed by the at least one processor, cause the at least one processor to perform at least the following:

determine power demands from the external power inlet;

determine a state of charge of the battery;

route power from the solar panel to either of the battery or the external power inlet by prioritizing either (i) power demands from the external power inlet, (ii) charging the battery based on the state of charge of the battery, or (iii) power demands from the at least one RV load based on a user preference indicated through the user device; and send a notification to the user device when the battery will not reach a desired state of charge before a period of time that the RV is to be connected to the solar panel.

12. The RV power system of claim 11, wherein the machine readable instructions stored in the at least one non-transitory memory module further cause the at least one processor to determine a desired state of charge of the battery based on the user preference indicated through the user device.

13. The RV power system of claim 12, wherein the machine readable instructions stored in the at least one non-transitory memory module further cause the at least one processor to:

determine a period of time that the power conversion unit is to be connected to the solar panel; and charge the battery to the desired state of charge during the period of time that the power conversion unit is to be connected to the solar panel.

14. The RV power system of claim 13, wherein the machine readable instructions stored in the at least one non-transitory memory module further cause the at least one processor to notify a user if the battery is unable to be charged to the desired state of charge during the period of time that the RV is to be connected to the solar panel.

15. The RV power system of claim 11, wherein the machine readable instructions stored in the at least one non-transitory memory module further cause the at least one processor to send a notification to the user device when the battery has reached a desired state of charge.

16. A recreational vehicle (RV) power system comprising:

a battery;

a power conversion unit coupled to the battery, the power conversion unit comprising at least one input and at least one output, wherein:

the at least one input of the power conversion unit is coupled to a first solar array and a second solar array; and the at least one output of the power conversion unit is coupled to the battery and an external power inlet;

at least one processor communicatively coupled to a user device;

at least one non-transitory memory module communicatively coupled to the at least one processor and storing machine readable instructions that, when executed by the at least one processor, cause the at least one processor to perform at least the following:

determine power demands from the external power inlet;

determine a state of charge of the battery;

determine a desired state of charge of the battery;

route power from the first solar array and the second solar array to either of the battery or the external power inlet; and send a notification to the user device when the battery will not reach the desired state of charge before a period of time that the RV is to be connected to the first solar array and the second solar array.

* * * * *